April 10, 1962 L. M. LEEDS 3,029,399

MODULATOR

Filed Dec. 29, 1959 3 Sheets-Sheet 1

INVENTOR.
LAURANCE M. LEEDS
BY
Joseph P. Kates
ATTORNEY

INVENTOR.
LAURANCE M. LEEDS
BY
Joseph P. Kates
ATTORNEY

April 10, 1962 L. M. LEEDS 3,029,399
MODULATOR
Filed Dec. 29, 1959 3 Sheets-Sheet 3

INVENTOR.
LAURANCE M. LEEDS
BY
Joseph P. Kates
ATTORNEY 3,029,399
MODULATOR

Laurance M. Leeds, Syracuse, N.Y., assignor to General Electric Company, a corporation of New York Filed Dec. 29, 1959, Ser. No. 862,583
13 Claims. (Cl. 332—44)

Figure 1:
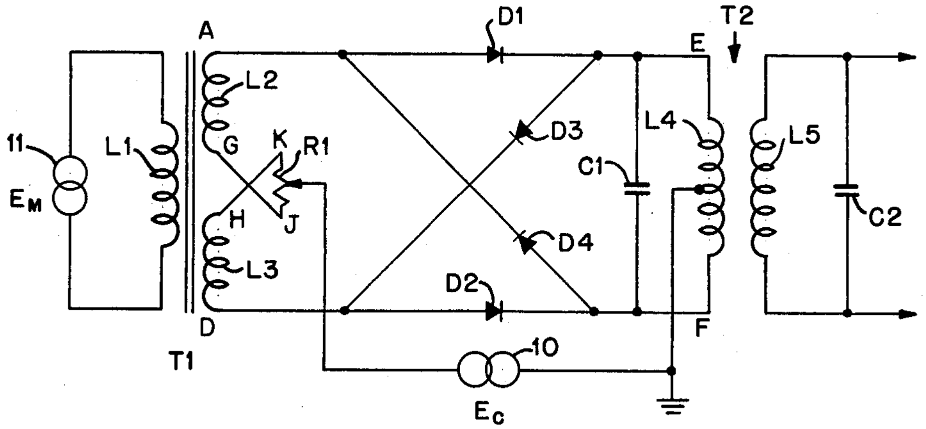

The present invention relates to a modulator and more particularly relates to a double balanced modulator of the ring type wherein the modulating frequency input may be a single ended circuit and wherein the carrier in the output wave may be suppressed or optionally may be set to predetermined ratio with respect to sideband amplitude.

Prior art ring modulators are used principally where the modulating frequency is to be modulated on a relatively low frequency carrier to get an amplitude modulated double sideband output wherein the carrier frequency energy is suppressed. The inherent balance of ring modulators rejects the modulating frequency from the output. In a non-balanced modulator, input modulating frequency appears in the output. This intrinsic attenuation of the modulating frequency in a balanced modulator also eases substantially the problem of filtering. When the carrier frequency is not too far removed from the highest modulating frequency, selecting the sidebands desired for retention in the output and removing the remainder of the energy presents filtering problems. The ring modulator is also balanced to prevent the carrier frequency proper from appearing in the output and hence the output of a properly balanced ring modulator is an amplitude modulated double sideband signal with the carrier suppressed. However, prior art double balanced modulators of the ring type had disadvantages in that they couldn't handle low frequency modulation. In addition, such prior art systems did not have means for setting the carrier to any desired ratio with respect to sideband amplitude. These defects of the prior art devices are particularly disadvantageous in an application such as involved in modulating slow scan television signals on a relatively low frequency carrier wherein the modulating voltage ranges from a low of almost D.-C. (0.06 cycle per second, for example) and upward (for example, 8 kc.) within the audio range. In such applications, the inclusion of the frequencies at the lower end of this range of frequencies precludes the use of an input transformer. Since the signal at its lower frequency is at substantially direct current (a fraction of a cycle per second), it is advantageous to provide a single ended modulator input to thus avoid the use of balanced D.-C. amplifiers. Such D.-C. amplifiers are generally unstable and are costly.

As used herein the term "double balanced modulator" applies to a circuit in which the carrier and modulating signal are so introduced that after modulation takes place, the output contains the two sidebands without either the carrier or the modulating signal. The term "ring modulator" applies to a rectifier modulator (which may also be used as a demodulator) employing four diode elements connected in series to form a ring. The diodes are connected with a polarity which will readily permit current flow around the ring in one direction. Appropriate input and output connections are made to the four nodal points of the ring. The ring modulator is also called a double balanced modulator. It can serve as a balanced modulator as well as a phase sensitive detector or demodulator. The term "single ended" is used to denote asymmetric structure and operation with respect to ground.

Prior art double balanced or ring modulators are described in Radio Engineering Handbook, Keith Henney, McGraw-Hill Book Company, 5th Ed., 1959, on pages 12–45 and 12–46. Other prior art modulators are shown in the patented device of Grey for a "Mixer Modulator," Patent 2,695,988, issued November 30, 1954, that of Hey for "Balanced Modulator," Patent 2,820,949, issued January 21, 1958, and of Riesz for "Modulating Systems," Patent 2,438,948, issued April 6, 1948. These prior art modulator devices, however, are not satisfactory for frequency ranges in the low audio or approaching D.-C. range where an input transformer cannot be used for coupling in modulation input and they do not provide circuit configurations wherein modulating frequency input in a ring modulator are made single ended and the carrier is suppressed or controlled in the output by D.-C. adjustment means to provide an ideal sum and difference frequency modulator output selectively with or without pilot carrier suitable, for example, to modulate a slow scan TV (television) signal on a relatively low frequency carrier.

The present invention eliminates these and other disadvantages of devices of the prior art and it provides optionally either substantially complete suppression of the carrier or an adjustable ratio of the carrier to the sidebands; it is suitable for such uses as modulating a slow scan TV signal on a low frequency carrier and wherein the low frequencies are so low as to preclude the use of an input transformer; it provides single ended modulating signal input for simplicity and for avoiding use of D.-C. amplifiers. The simple way to unbalance the modulator so that the carrier wave can be introduced into the output in any desired percent presented by the invention allows, for example, sending a pilot carrier to provide a notch signal (in slow scan television) to permit sending a synchronizing wave; it also allows sending of phase information to the detector in a receiving system adapted to receive this transmission which is in the case of low frequency almost to D.-C., the only way of finding out the phase of the carrier when the carrier is completely suppressed. The present inventive system by permitting sending a small pilot carrier thus enables detection of the signal at the receiver.

Accordingly, an object of the present invention is to provide an apparatus and a method for mixing and modulating two signal frequencies to produce an output from which both input signal frequencies are excluded, and the invention is especially adaptable where low frequency modulation approaching zero frequency or D.-C. is to be used.

Another purpose of the present invention is to provide a doubly balanced ring type modulator wherein the modulating frequency input means is a single ended circuit and which will include adjustment means to insure complete suppression of the carrier in the output wave as well as elimination of the input modulating frequencies from the output.

Another aim of the present invention is to provide a modulator wherein the fodulating frequency is modulated on a carrier of relatively low frequency such that inherent balance of the basic ring circuit rejects the modulating frequency from the output to ease the problem of filtering to select desired sideband output when the carrier frequency is not too far removed from the highest modulating frequency and to provide an amplitude modulated double sideband output with the carrier suppressed selectively completely or in a desired ratio to the sidebands.

Another object of the present invention is to provide a modulator capable of producing amplitude modulated double sideband output either with both input signal frequencies not present in the output when adjustment is made for completely suppressing the carrier in the output wave, or for setting the carrier to any desired ratio with respect to the sideband amplifier when such adjustment is made and wherein the modulator includes a simple adjustable voltage source to effect such adjustment.

Another purpose of the present invention is to provide a double balanced ring type modulator wherein at least the modulating frequency input is a single ended circuit for simplicity and avoidance of possibly unstable D.-C. amplifier circuits and wherein adjustment means is provided for optionally completely suppressing or setting the carrier in the output wave to predetermined desired ratio with respect to sideband amplitude so that a pilot carrier output signal may be provided for such application as where advisable for receiver detection or for a notch for synchronizing signals or for sending of phase information.

Another aim of the present invention is to provide for modulation of a slow scan television signal on a relatively low frequency carrier wherein input frequency is so low as to preclude use of an input transformer and wherein a single ended modulating input is provided to permit coupling in while avoiding use of balanced D.-C. amplifiers.

Another object of the present invention is to provide a modulator wherein the modulating signal can be of any waveform and which modulator may be D.-C. referenced to be useful in television D.-C. transmission, the carrier amplitude of the output of the modulator being adjustable to any desired ratio relative to sideband amplitude including zero.

Figure 4A:
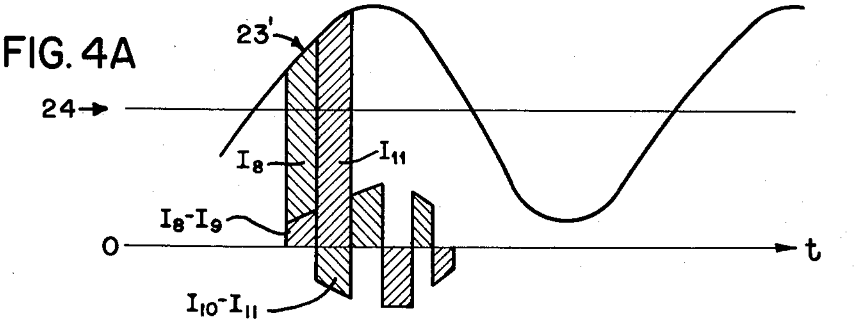
Figure 4B:
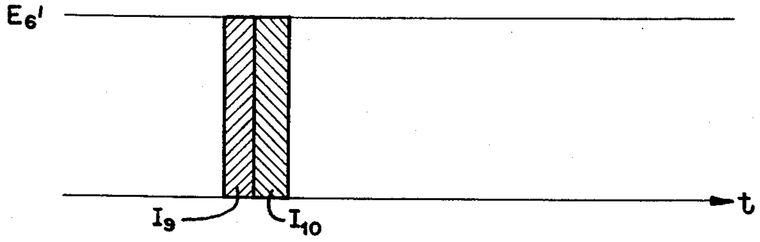
Figure 2:
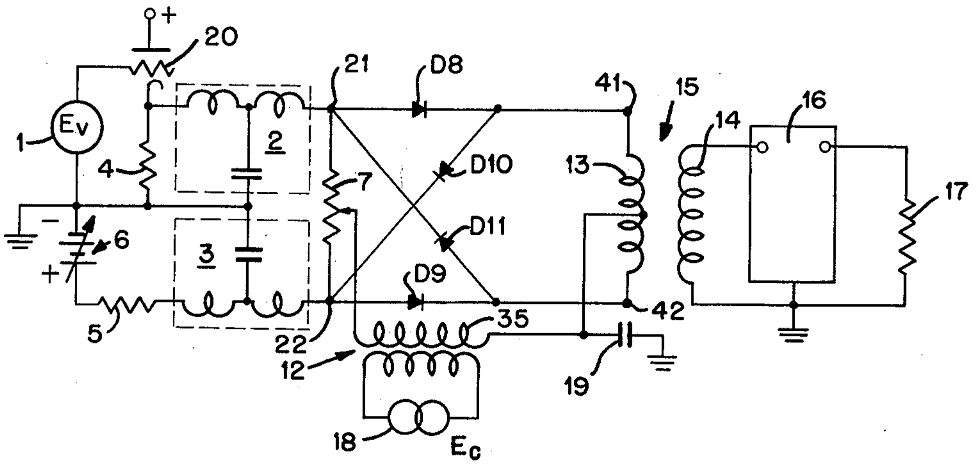
Figure 3:
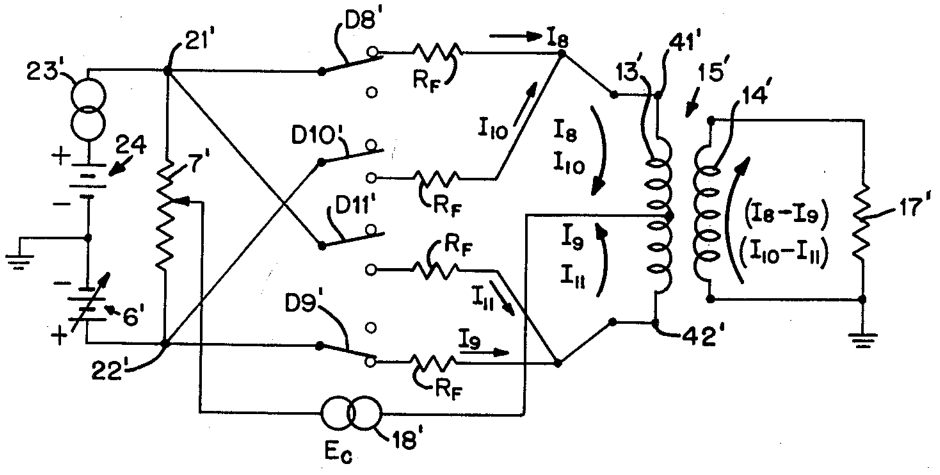

While the novel and distinctive features of the invention are particularly pointed out in the appended claims, a more expository treatment of the invention, in principle and in detail, together with additional objects and advantages thereof is afforded by the following description and accompanying drawing in which:

FIG. 1 is a schematic representation of a basic ring modulator circuit suitable where modulating frequency is such that modulating voltage may be applied push-pull in a range high enough to be passed by a transformer, FIG. 2 is a schematic representation of an illustrative embodiment of the modulator of the present invention, FIG. 3 is a simplified equivalent circuit of the apparatus of FIG. 2 for purposes of explanation of the circuit of FIG. 2 in which the filters of FIG. 2 are omitted and the diodes are replaced with switches, FIGS. 4A and 4B are analytical graphical representations of the current through the respective diodes to explain the operation of FIG. 2 and FIG. 3.

Figure 5:
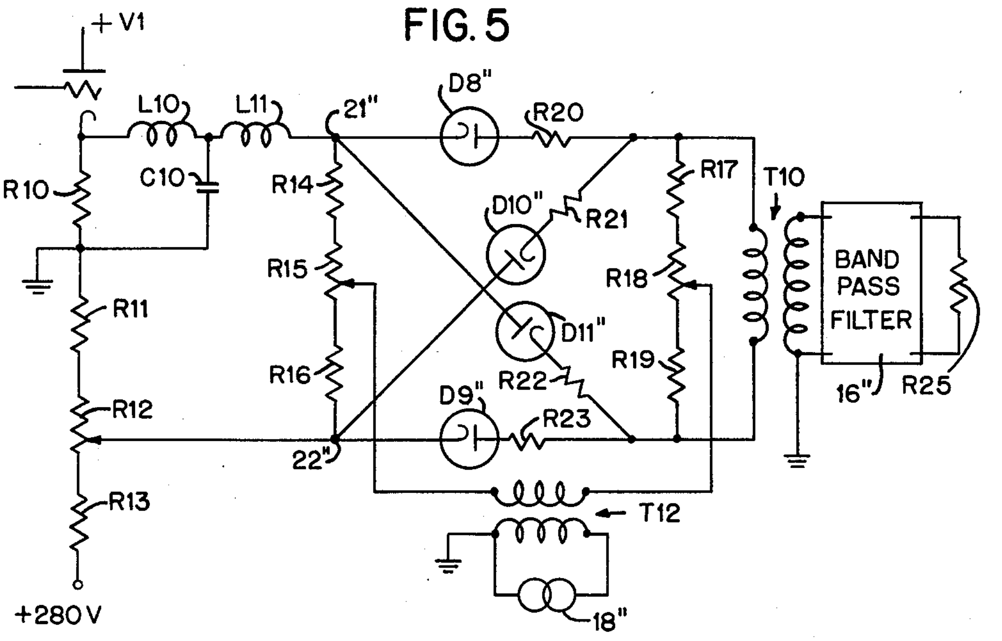
Figure 6A:
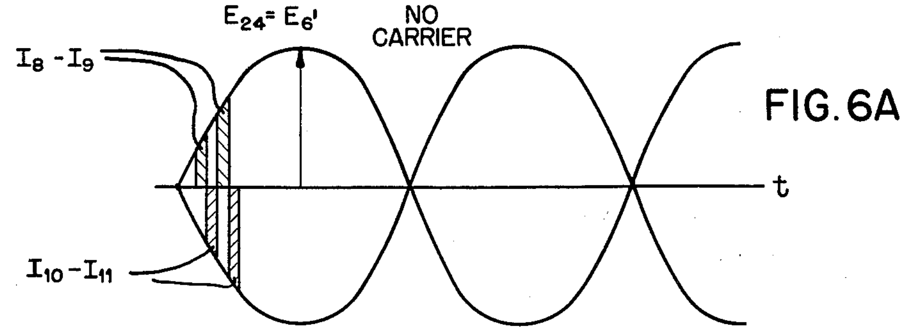
Figure 6B:
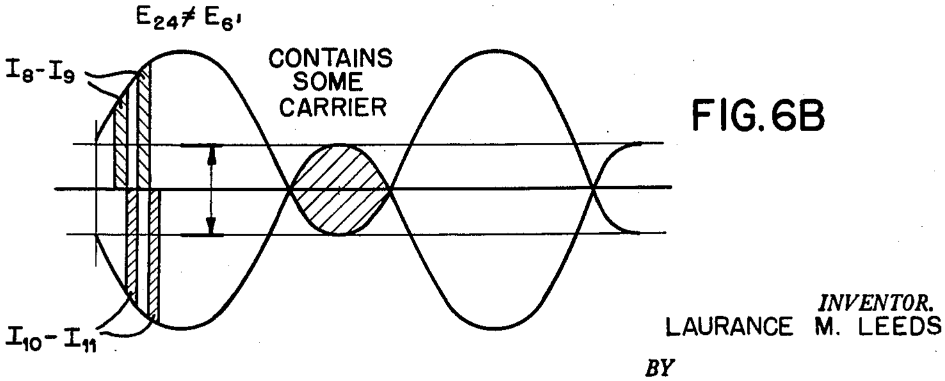

FIG. 5 is a schematic representation of a practical embodiment of the invention, FIG. 6A is a graphical representation showing absence of carrier in the output waveform of the circuit of FIG. 2 under adjustment of the adjustable source voltage to equal the modulating signal generator circuit D.-C. voltage, and, FIG. 6B is a graphical representation showing presence of carrier in the output waveform of the circuit of FIG. 2 under adjustment of the adjustable source voltage to be other than the voltage of the circuit D.-C. voltage of the modulating generator.

The invention herein of a double balanced ring modulator provides for the modulating frequency input to be a single ended circuit. The inventive means for adjustment of a D.-C. voltage permits either complete suppressing of the carrier in the output wave, or setting the carrier to any desired ratio with respect to the sideband amplitude.

Ring modulators are especially suitable when modulating frequency is to be modulated on a carrier of relatively low frequency. The inherent balance of the basic ring circuit rejects the modulating frequency from the output. This modulating frequency would otherwise appear in the output of a non-balance system and would have to be filtered out. The intrinsic attenuation of the modulating frequency in the basic ring circuit eases the problem of filtering that is of selecting the desired sideband when the carrier frequency is not too far removed from the highest modulating frequency. The ring modulator is also balanced against the carrier itself and hence the output may comprise suppressed carrier amplitude modulated double sideband energy.

Now referring to FIG. 1 wherein is shown the basic ring modulator circuit, a carrier generator 10 may be disposed between the slidable contact arm of a potentiometer R1 and ground. The resistance portion of potentiometer R1 may be disposed between two secondary windings L2 and L3 of a modulating signal input transformer T1. Input transformer T1 may be provided to introduce modulating voltage and may have a primary winding L1 as well as secondary windings L2 and L3. Respective ends G and H of windings L2 and L3 may be connected to respective ends J and K of the resistance portion of potentiometer R1. Disposed across the primary L1 of input transformer T1 may be a source of modulating voltage as a modulator generator 11 to introduce modulating voltage $E_M$ into the modulator. The carrier generator 10 supplies input carrier signals $E_C$. An output transformer T2 may be provided and may have a primary winding L4 and a secondary winding L5. The primary L4 of output transformer T2 may be center tapped approximately and grounded as by connection to the lead to ground on the grounded side of the carrier generator 10. Disposed across the secondary L5 of output transformer T2 may be a capacitor C2. Disposed between the opopsite ends A and D of the secondary windings L2 and L3 of input transformer T1 on one end and the primary 24 of transformer T2 on the other end may be a modulator ring of four diodes D1, D2, D3 and D4 connected in series to form the ring. That is, the diodes are connected with a polarity which will readily permit current flow around the ring in one direction. Connected between end A of the secondary winding L2 of the input transformer T1 and the corresponding end E of the primary L4 of output transformer T2 may be diode D1. The plate of diode D1 may be connected to the end A of the input transformer T1 and its cathode may be connected to the corresponding end E of the output transformer T2. Connected between the end D of the other secondary winding L3 of transformer T1 and the other end F of the primary L4 of output transformer T2 may be a second semi-conductor rectifier diode D2. Diode D2 may have its plate or anode connected to the end D of secondary L3 of transformer T1 and may have its cathode connected to the end F of the primary L4 of transformer T2. Connected between the cathode of diode D1 and the plate of diode D2 may be a third bridge diode D3. Diode D3 may have its cathode connected to the plate of diode D2 and its anode connected to the cathode of diode D1. Fourth diode D4 may have its cathode disposed between the anode of diode D1 and the end A of the secondary winding L2 of transformer T1 and may have its anode disposed between the cathode of diode D2 and the end F of primary L4 of output transformer T2. It should be understood that the diodes D1, D2.

D3 and D4 may be semi-conductors or may be of a high vacuum type. Sinicon or germanium rectifiers, for example, might be used. As shown in FIG. 1 the modulating voltage $E_M$ may be applied from generator 11 in push-pull to the ring modulator circuit and the carrier generator 11 applying carrier voltage $E_C$ may be single ended.

Operation occurs as follows:

In the presence of a strong carrier (for example, in the neighborhood of 20 volts) diodes D1 and D2 will be saturated with current when the carrier voltage $E_C$ is positive and diodes D3 and D4 will be closed to provide current conduction when the carrier voltage $E_C$ is negative. Thus the diodes act as a double pole, double throw switch operating at a carrier frequency rate to reverse the output circuit across the primary L4 of transformer T2 relative to the push-pull modulating voltage $E_M$ from generator 11 which appears across transformer T1. This type of input and circuit may be utilized when the frequency range of the modulating voltage $E_M$ is within a band of frequencies (such as in the audio range) which can be passed by a transformer.

Now referring to FIG. 2, a preferred embodiment of the inventive ring modulator is shown. A discharge device 20 may be provided and may be a triode vacuum tube having an anode, a control electrode and a cathode. Signal voltage $E_V$ from a generator or other source of signal voltage 1 may be applied to the control electrode of discharge device 20. Disposed between the cathode of stage 20 and ground may be an output cathode resistor 4. The source of signal voltage $E_V$, 1 may be disposed between the control electrode of stage 20 and ground. A ring modulator may be provided which may comprise a plurality of diodes or rectifiers which may be semi-conductors or of the high vacuum type D8, D9, D10 and D11, respectively. Diodes D8, D9, D10 and D11 may be connected in ring sequence in an arrangement as respective diodes D1, D2, D3 and D4 of the modulator ring of FIG. 1. Diode D8 may have its plate connected to a modulating input terminal 21 and may have its cathode connected to one end 41 of the primary 13 of an output transformer 15. Output transformer 15 also may comprise a secondary winding 14. Disposed between the cathode of stage 20 and terminal 21 may be a low pass filter shown schematically as block 2, which serves to pass the complete range of modulating frequencies and to reject the carrier frequencies together with the upper and lower sidebands of the resulting modulation products. A second terminal 22 of the ring modulator may be provided and may be joined to terminal 21 by the resistance portion of a potentiometer 7. Disposed between the sliding arm of potentiometer 7 and ground may be in series, respectively the secondary winding 35 of an input transformer 12 and a capacitor 19. The junction between the secondary of transformer 12 and capacitor 19 may be connected to a center tap of the primary 13 of transformer 15. Disposed across the primary of input transformer 12 may be a source 18 of carrier waves $E_C$. Disposed between terminal 22 and the other end 42 of winding 13 of transformer 15 may be the diode D9 which may have its plate connected to terminal 22 and its cathode connected to end 42 of the winding 13. Disposed between terminal 21 and the junction between winding 13 and the cathode of diode D9 may be the diode D11 which may have its plate or anode connected to the junction between diode D9 and end 42 of winding 13 and which may have its cathode connected to terminal 21. Disposed between terminal 22 and the junction between the cathode of diode D8 and end 41 of primary winding 13 may be a diode D10 which may have its cathode tied to terminal 22 and its anode disposed at the junction between the cathode of diode D8 and end 41 of winding 13 of transformer 15. Disposed between terminal 22 and ground may be a low pass filter 3, then a resistor 5 and then an adjustable or variable voltage supply source 6. Low pass filter 3 may have characteristics substantially identical to those of low pass filter 2. Variable or adjustable D.-C. voltage source or battery 6 may have its positive side connected to resistor 5 and its negative side connected to ground. Output transformer 15 may have a secondary output winding 14 which may be grounded on one end. Disposed between the high side of secondary 14 and ground in parallel with and responsive to secondary 14 may be a bandpass filter 16. Disposed in parallel with the winding 14 (and with filter 16) may be an output load represented by resistor 17.

The apparatus of FIG. 2 may be useful for modulating a signal such as a slow scan TV signal on a relatively low frequency carrier. For example, assume an input frequency spectrum extending from approximately D.-C. (less than 0.06 cycle per second) up to approximately 8 kilocycles (kc.). The inclusion of the very low frequencies precludes the use of an input transformer. That is, since the signal goes down in frequency to substantially direct current (D.-C.) it is highly advantageous to provide a single ended input thus avoiding the use of balanced D.-C. amplifiers. As noted device 20 of FIG. 2 does provide such a single ended input.

In operation the signal voltage $E_V$ may be applied from signal voltage source 1 to the control electrode or grid of discharge device 20 which is connected as a cathode follower. The output modulating or signal voltage appears across the cathode resistor 4 which is the load developing resistor and is coupled to terminal 21 of the ring modulator through the low pass filter 2. This provides single ended input of modulating frequency. Battery 6 is connected through resistor 5 and low pass filter 3 to terminal 22 of the ring modulator. Battery voltage 6 is adjusted to provide either complete suppression of the carrier or to suppress the carrier with relation to the sidebands as desired. Carrier voltage $E_C$ from generator or other source 18 may be coupled to the modulator through transformer 12 from the primary of transformer 12 to its secondary 35. That is, carrier voltage $E_C$ is applied from carrier voltage generator or other source 18 across transformer 12 to its secondary 35 and is applied between the center tap of primary winding 13 of transformer 15 and the sliding contact arm of balancing potentiometer 7. The center tap of the primary 13 of output transformer 15 may be by-passed to ground at the carrier frequency through bypass capacitor 19. Transformer 15 may be a wideband push-pull to single ended device having a substantially flat transfer characteristic over the frequency band $F_C \pm F_V$, where $F_C$ is the carrier frequency and $F_V$ is the highest modulating frequency. The output from secondary 14 of transformer 15 may be connected to the output load resistor 17 through bandpass filter 16. Potentiometer 7 is used to balance the carrier excitation to the ring modulator. The ring modulator may be considered as composed of diodes D8, D9, D10 and D11. Potentiometer 7 has an impedance value which is nominally high compared to the characteristic impedance of the wave filters 2 and 3. Looking back from the modulator, filter 3 is terminated in resistor 5 and filter 2 is terminated in the generator impedance of electron discharge device or tube 20. Wave filters 2 and 3 may maintain the symmetry relative to terminals 21 and 22 of the ring modulator and also provide an isolating impedance to the carrier frequency voltage $E_C$ and the generated sidebands while freely passing the voltage signals from the signal source or modulating source 1 and freely passing the battery D.-C. potential 6. The latter as may be seen is coupled through resistor 5 and the winding elements of filter 3 to terminal 22 and D.-C. ground return is provided across the resistance portion of resistance 7 across the coils of the filter 2 and the cathode resistor 4. In operation of the circuit of FIG. 2, on one-half of the carrier cycle of signals $E_C$ from carrier source 18, diodes D8 and D9 will be closed to permit current flow in the forward direction therethrough and diodes D10 and D11 are biased in the current blocking condition. On the other half of the carrier cycle, diodes D10 and D11 are conducting and diodes D8 and D9 are biased to be cut off.

Thus the push-pull connected primary 13 will be alternately reversed in its connection to the instantaneous potentials existing at terminals 21 and 22 of the modulator.

In the circuit of FIG. 2 the low modulating frequency is coupled directly to the control electrode of single ended input device 20 and avoids the use of balance D.-C. amplifiers. In addition, battery voltage 6 may be adjusted as will be described further hereinbelow to provide substantially complete suppression of the carrier resulting in double sideband carrier suppressed output potential across load 17. Battery 6 may be adjusted also to vary the carrier with respect to the sideband voltages in a predetermined manner.

Now referring to FIG. 3 of the drawings there is shown a simplified circuit equivalent to the circuit of FIG. 2 but with the filters 2 and 3 omitted and with the diodes shown as switches operating in conjunction with diode forward resistances $R_F$ and backward resistances $R_B$ (not shown).

In the explanation of the simplified diagram of FIG. 3 assumes diode back resistance $R_B$ to be very high compared to the forward resistance $R_F$ of the diode such that in the backward direction through the diodes their resistances $R_B$ can be considered as open circuits. The stage 20 and signal voltage 1 of FIG. 2, that is, the signal voltage which appeared across terminal 21 and ground is replaced in FIG. 3 by its equivalent, the modulating A.-C. voltage 23′ in series with the D.-C. voltage of the generator 24. Disposed between ground and terminal 22′ is the adjustable battery 6′ with the negative terminal of the battery 6′ grounded. Between terminals 21′ and 22′ is the resistance portion of potentiometer 7′. The slidable contact arm of potentiometer 7′ is connected to the source 18′ of carrier signals $E_C$ on one end of source 18′. Source 18′ of carrier voltage $E_C$ is connected to the center tap of primary 13′ of output transformer 15′. Switches D8′, D10′, D11′ and D9′ are shown with switches D8′ and D9′ in closed position, switch D8′ having the pivot of its contact arm connected to terminal 21′ and its closing contact connected to an end 41′ of primary 13′ through schematically shown resistance $R_F$ of diode switch D8′ through which the current $I_8$ flows in closed or conducting condition of diode switch D8′. Connected to terminal 22′ on one side through the forward resistance $R_F$ of diode switch D10′ and the end 41′ of primary 13′ of transformer 15′ on the other side is the switch D10′ with its pivot connected to terminal 22′ and shown in open or current blocking switch position. In closed position of switch D10′, current $I_{10}$ passes through switch D10′. The other end 42′ of primary 13′ of transformer 15′ is connected to switches D9′ and D11′. Switch D11′ is shown in open position. The pivot of switch D9′ is connected to terminal 22′ and the pivot of switch D11′ is connected to terminal 21′. Primary 13′ of transformer 15′ is shown center tapped with the center tap returned to the carrier generator 18′. The current flowing through switch D11′ in its closed position is current $I_{11}$ and the current through switch D9′ in its closed position is current $I_9$. Currents $I_{11}$ and $I_9$ flow through the lower half shown on FIG. 3, of primary 13′, the upper half of the primary 13′ shown in FIG. 3 having currents $I_8$ and $I_{10}$ flowing therethrough in reverse direction to that through the lower half of primary 13′. The secondary 14′ of transformer 15′ may couple the currents $I_8$—$I_9$ and $I_{10}$—$I_{11}$ across load 17, one junction between load resistor 17 and secondary 14′ being grounded.

Referring now back to FIG. 2, as long as the tube 20 is operating; that is, while it is in conduction, current flow across resistor 4 in the cathode will cause a voltage to be developed such that there will be a definite positive voltage at the cathode of stage 20. This is the voltage 24 which is the tube generator voltage shown in FIG. 3. When the voltages at points 21 and 22 are equal, the carrier is suppressed in the circuit output and conversely a slight difference in voltage between points 21 and 22 will cause corresponding introduction of carrier into the output. Therefor, in order to make the voltage at point 22 (22′ of FIG. 3) be equal to the voltage at the cathode which is substantially that at point 21 (21′ of FIG. 3) at the cathode of stage 20 a voltage will be required to oppose that at the cathode of stage 20 so as to equalize the voltage between terminals 21 and 22. This is provided by adjustable source 6 (6′ in FIG. 3) which is adjusted to make the voltage at 21 and 22 equal for carrier suppression in the output. The battery 24 of FIG. 3 therefore represents the unavoidable voltage which appears at the cathode of the tube 20 in FIG. 2 since the bottom of the cathode resistor 4 is grounded and there is current flow through resistor 4. The A.-C. signal voltage is represented by 23′ of FIG. 3. To make the D.-C. voltage at points 21′ and 22′ of FIG. 3 equal the battery 6 is provided to equalize and oppose the voltage of the battery 24, which is the cathode resistance voltage at the cathode of tube 20 caused by current passing through resistor 4.

As stated, the modulating A.-C. voltage of modulator 23′ is in series with the D.-C. voltage 24. Assume that the modulating A.-C. voltage from modulator 23′ is sinusoidal and that the battery voltage of battery 6′ has been adjusted to be substantially equal to the D.-C. voltage of D.-C. source or battery 24. This adjustment will result in a substantially complete suppression of the carrier and the output potential across load 17 will be a double sideband carrier suppressed output.

This may be explained as follows:

Referring to FIGS. 4A and 4B in conjunction with FIG. 3, the current in secondary winding 14′ of transformer 15′ is proportional to current $I_8$—current $I_9$ during one-half of the carrier wave cycle and is proportional to current $I_{10}$—Current $I_{11}$ during the other half of the carrier cycle. That is, with the respective switches D8′ and D9′ closed, current $I_9$ will buck current $I_8$ and with respective switches D10′ and D11′ closed current $I_{11}$ will buck or oppose current $I_{10}$. The voltage $E_6$ of battery 6 (or 6′) may be adjusted to be other than equal to the D.-C. voltage 24. In such cases as shown in FIG. 4A and FIG. 6B the carrier itself will be present in the output in addition to the two sidebands. It is also apparent that the carrier amplitude can be set to any desired ratio relative to the sideband amplitude. The modulating signal can be of any waveform and may be D.-C. referenced for use in television D.-C. transmission. For example, noting the value of voltage E of 24, the D.-C. reference level with respect to ground and the currents $I_8$ and $I_{11}$ shown in FIG. 4A and noting the level of voltage E of 6 (or 6′) with respect to ground of FIG. 4B and the relative amplitude of currents $I_9$ and $I_{10}$ thereto, it may be seen that when voltage 24 is equal to voltage $E_6$, current $I_8$ minus current $I_9$ will balance out the D.-C. component to give only the modulating A.-C. component as a remainder envelope and similarly current $I_{10}$—current $I_{11}$ will balance to give the opposite side of the envelope. However, when the voltage of 6 or 6′ as shown in FIG. 4A is made lower or higher than the voltage 24, there is a finite difference between the D.-C. component of current $I_8$—current $I_9$ and between the current $I_{10}$—current $I_{11}$. Thus not only the sidebands but also the carrier will be present in the output.

The carrier voltage $E_C$ serves to turn or switch the diodes on and off. That is on the positive carrier wave swing, diode switches D8 and D9 will be closed and currents $I_8$ and $I_9$ will flow therethrough (shown in FIG. 3 in the plus to minus or ground direction). At this time if the D.-C. voltage at terminal 21′ due to the D.-C. voltage 24 of generator 23′ is equal to that of terminal 22′ due to source 6′, then the D.-C. components of currents $I_8$ and $I_9$ will be equal and opposite and will cancel. Similarly, on the negative swing of the carrier, diode switches D10′ and D11′ will close allowing currents $I_{10}$ and $I_{11}$ to flow therethrough and diodes switches D8′ and D9′ will open blocking current flow therethrough. In such switch condition if the balance has been achieved by adjustment of the slidable contact of potentiometer 7 in addition to the use of balanced diodes to render the conductivity of the diodes equal, then with equal voltages of 24 and 6′ at terminals 21′ and 22′, the currents $I_{10}$ and $I_{11}$ will oppose each other and their D.-C. components will cancel so that no carrier appears in the output. That is as shown in FIG. 6A when voltage $E_{24}$ (D.-C. voltage 24 of generator) equals voltage $E_6$, then there is no carrier while in case of unbalance when voltage $E_{24}$ does not equal voltage $E_6$, then the output as shown in FIG. 6B contains a carrier in accordance with the unbalance.

As shown in FIG. 4A the A.-C. wave 23 from the wave output of modulating source 23′ of FIG. 3 rides on the D.-C. reference provided by the cathode voltage 24. Assume the top and bottom switches are closed, that is the diodes D8 and D9. On the first cycle wherein D8′ and D9′ are closed and carrier voltage $E_C$ is positive; no appreciable change in voltage at points 21′ or 22′ occurs with the carrier in the plus position because of the relatively large impedance of the carrier source and the relatively large impedance of the resistance portion of the potentiometer 7 which causes substantially the entire carrier swing to be between the carrier and point 21′ as compared with the comparatively negligible drop across $R_F$. Points 21′ and 22′ are not raised in potential therefore, to the level of the carrier voltage. The effect of the carrier voltage is only to close the switches D8′ and D9′ when it is positive but it is not appreciable on the D.-C. level of points 21′ and 22′ (points 21 or 22 of FIG. 2). Thus, the appreciable difference in currents $I_8$ and $I_9$ and in currents $I_{10}$ and $I_{11}$ are caused by differences in potential at points 21 and 22 of FIG. 2 (21′ and 22′ of FIG. 3) substantially due to the voltage at the cathode of the generator 20 of FIG. 2 or the corresponding voltage 24 of FIG. 3 and due to adjustable source 6 of FIG. 2 or 6′ of FIG. 3. These are offset as shown in FIGS. 4A and 4B to provide carrier contained sidebands or suppressed carrier sidebands as shown in FIGS. 6B and 6A.

Now, referring to the practical embodiment of FIG. 5, in that embodiment the lower wave filter in the D.-C. comparison branch is omitted. In order to effect perfect balancing one thousand ohm (1K) resistors are added in series with each of the high vacuum diodes. This balances up the diodes since their forward resistances and hence the voltage drops across the diodes are negligible with respect to the one thousand ohms resistance and corresponding voltage drop to provide very approximately equal total forward resistance (and voltage drop) in each of the branches. Three added resistors one a 220Ω potentiometer and two 2.2KΩ resistors are added in order to permit exact balance of the input of the carrier to the primary of the output transformer to achieve perfect balance adjustments for the carrier on both the input and the output sides. Potentiometer R12, the 2KΩ potentiometer provides adjustment of the $E_B$ D.-C. balancing voltage in conjunction with the voltage dropping resistances and the 280 volt source. In this circuit as stated, the lower filter is omitted and the carrier is allowed to float with respect to ground. The filter may be omitted because there is sufficient impedance to the carrier frequency from terminal 22″ to ground.

While in no wise to be considered as limiting in the above invention the following table of values is illustrative of the successful embodiment of the circuit of FIG. 5.

| Part: | Value or designation |
|---|---|
| Diodes D8″, D9″, D10″, D11″ | Two 5726 tubes |
| Resistors, Ohms (Ω): | |
| R10 | 5.1K |
| R11 | 2K |
| R12 | 2K |
| R13 | 50K |
| R14 | 4.7K |
| R15 | 4.7K |
| R16 | 4.7K |
| R17 | 2.2K |
| R18 | 220 |
| R19 | 2.2K |
| R20 | 1K |
| R21 | 1K |
| R22 | 1K |
| R23 | 1K |
| Capacitors, microfarads ($\mu f.$): | |
| C10 | .01 |
| Inductors, millihenries: | |
| L10 | 5 |
| L11 | 5 |

[1] Frequency of carrier generator=200 kc.
K=1,000; $\mu$=1/1,000,000; milli=1/1,000.

While a specific embodiment of the invention has been shown and described, it should be recognized that the invention should not be limited thereto. It is accordingly intended in the appended claims to claim all such variations as fall within the true spirit of the invention.

What is claimed is:

1. A double balanced ring modulator comprising single ended modulating frequency input means, a ring modulator circuit responsive to said single ended input, carrier frequency input means to provide carrier frequency energy to said ring modulator circuit and an adjustable voltage source device connected in opposite polarity direction to said modulation frequency input means to suppress the carrier in the output wave to predetermined ratio including zero with respect to sideband amplitude.

2. The apparatus of claim 1 including a positive voltage source and wherein said single ended modulating frequency input means comprises an amplifier disposed between said positive source and ground, an input modulating signal source to provide modulation signals to said amplifier, said adjustable voltage source being positive on one side and grounded on the other.

3. Means to provide an output waveform comprising sidebands and a carrier, at least a portion of which is suppressed, from an input comprising a modulating wave and a carrier wave, said means comprising a ring modulator comprising a potentiometer including a resistance portion and a slidable contact arm, an output transformer comprising a primary winding, a first diode having its cathode connected to one end of said primary winding and its anode connected to one end of said resistance, a second diode having its cathode connected to the other end of said winding and having its anode connected to the other end of said resistance, a third diode having its cathode connected to said other end of said resistance and its anode connected to said one end of said winding and a fourth diode having its cathode connected to said one end of said resistor and its anode connected to said other end of said winding, a source of carrier frequency voltage, transformer means to couple said carrier wave into said modulator, said transformer means comprising a secondary winding, said secondary winding being disposed between said slidable contact arm of said potentiometer and a center tap point on said output transformer primary winding, an amplifier, means to apply said signal voltage to said amplifier, the output of said amplifier having modulating voltage output means connected to said one resistance side, an adjustable voltage source disposed between said other side of said resistance and ground, a resistor in series with said battery and disposed between the positive side of said battery and said other side of said potentiometer resistance, means to bypass the center tap of said primary of said output transformer to ground, at the carrier frequency, said amplifier output means comprising D.-C. voltage developing means in opposite polarity to said source voltage.

4. The apparatus of claim 3, said output transformer comprising a wide band push-pull to single ended device having a substantially flat transfer characteristic over the frequency band $F_C \pm F_V$ where $F_C$ is the carrier frequency and $F_V$ is the highest modulating frequency and wherein said amplifier comprises a cathode follower, the cathode resistance of which is the load D.-C. developing means in opposite polarity to said adjustable source.

5. The apparatus of claim 4, including an output load and a band pass filter in shunt with said load and disposed between one side of said secondary of said output transformer and ground and wherein said potentiometer is adjusted to balance the carrier excitation to the ring modulator.

6. The apparatus of claim 3, including a low pass filter connected between the output of the amplifier and said one side of said potentiometer resistance portion, said potentiometer resistance having a high impedance compared to the characteristic impedance of the filter, said filter being of characteristics to isolate the amplifier at the carrier and side bands frequencies while passing the modulating output and the amplifier output D.-C. potential.

7. The apparatus of claim 3 including a first low pass filter connected between the output of said amplifier and said one side of said potentiometer resistance portion and a second low pass filter connected between said adjustable voltage source connected resistor and said other side of said resistance, the characteristic impedance of the first and second filters being substantially equal, said potentiometer resistance having a high impedance value as compared to the characteristic impedance of the filters, said filters maintaining the symmetry relative to the ends of said resistance portion of said potentiometer and providing an isolating impedance to the carrier frequency and the generated sidebands while freely passing the signal source and the D.-C. potential from said adjustable voltage source.

8. A balance modulator comprising a potentiometer having a resistance portion terminating in a first terminal on one resistance portion side and a second terminal on the other resistance portion side and an adjusting contact arm, a single ended source of carrier voltage signals disposed between said potentiometer contact arm and A.-C. ground, an output transformer comprising a primary and a secondary winding, said primary of said output transformer having a first end and a second end, a first electronic switch disposed between said first terminal and said end of said winding, a second electronic switch disposed between said second terminal and said first side of said primary, a third electronic switch disposed between said first terminal and said second side of said primary and a fourth electronic switch disposed between said second terminal and said second side of said winding, each of said switches having a very low forward resistance compared to its backward resistance, a single ended source of signal voltage including a D.-C. voltage developing means disposed between said first terminal and ground, an adjustable D.-C. voltage source disposed between said second terminal and ground, said adjustable D.-C. voltage being selectively adjustable to be substantially equal to the D.-C. voltage of said signal voltage generator causing substantially complete suppression of the carrier to provide a double sideband carrier suppressed output potential from said output transformer and adjustable to be of different voltage than said D.-C. voltage to enable a pilot carrier output with the sidebands.

9. A doubly balanced ring modulator comprising a ring modulator circuit comprising an input potentiometer having a resistance portion, a plurality of diodes in ring relationship and an output transformer having a primary winding, the potentiometer resistance ends and the primary ends connecting the diode elements, means to provide carrier frequency input and single ended modulating frequency input to said ring modulator and an adjustable D.-C. voltage source disposed between the resistance portion of said potentiometer and ground to provide adjustability of carrier suppression in the output wave so as to set the carrier to desired ratio with respect to sideband amplitude.

10. A doubly balanced modulator comprising a ring modulator circuit including an input potentiometer having a resistance portion and an adjustable arm and an output transformer, said ring modulator comprising four diodes having their cathode to plate forward impedances disposed in cathode to plate relationship of succeeding stages, said potentiometer resistance portion being joined to the plates of two of said diodes and to the cathodes of the other two diodes, said primary of said output transformer being disposed across the plates of the two diodes for which the cathodes are connected to the potentiometer resistance portion and across the cathodes of the other two diodes, single ended input amplifier means, means to apply signal voltage to said single ended amplifier means, carrier input means disposed between the arm of said potentiometer and a center tap point on said primary, adjustable voltage means disposed between one end of the resistance portion of said potentiometer and ground with its positive terminal connected towards the resistance portion, said input amplifier comprising a cathode follower disposed between a B+ source and ground, output being taken off the resistor of said cathode of said cathode follower and applied to the other end of said resistance portion, said signal voltage being applied between the control electrode of said amplifier and ground.

11. The apparatus of claim 10 including a low pass filter disposed between the cathode of said amplifier and said other end of said resistance portion of said potentiometer, a second low pass filter disposed between said positive side of said battery and said second side of said resistance portion of said potentiometer, and a resistor disposed between the positive terminal of said battery and said second low pass filter, said potentiometer balancing the carrier excitation to the ring modulator diodes and having an impedance value which is high compared to the characteristic impedance of the input filters, said second filter being terminated in said resistor, said first filter being terminated in said generator impedance of said discharge device cathode follower amplifier, said filters maintaining symmetry relative to the sides of said resistance portion of said potentiometer and providing an isolating impedance to carrier frequency and generated sidebands while freely passing the signal source and the battery potential from the input amplifier and the input adjustable D.-C. voltage.

12. Means for modulating a slow scan TV signal on a relatively low frequency carrier in a range of modulating voltage extending from close to D.-C. to an amount approximately within the audio range comprising a ring modulator having a plurality of diodes, an input potentiometer resistance portion and an output transformer having a primary winding, connected in ring modulator arrangement, said ring modulator diodes comprising a diode forward path from one end of said output transformer primary winding back to the same end comprising a first forward path through a first diode from the first end of said primary to one end of said resistance portion of said potentiometer, a second forward path through a second diode disposed between the plate of said first diode and the other side of said primary, a third forward path through a third diode disposed between the plate of said second diode and the other side of said resistance portion of said potentiometer, and a fourth forward path through a fourth diode disposed between the plate of said third diode and the first side of said output transformer primary, a single ended cathode follower amplifier responsive to signal voltage to provide an amplified signal voltage output, said output being connected to said first side of said resistance portion of said potentiometer, said output being developed between the cathode of said cathode follower and ground, an adjustable voltage source and a resistor in series disposed between ground and said other side of said resistance portion of said potentiometer, input carrier signal means comprising the secondary of a transformer to provide an input carrier wave, said secondary being disposed between the contact sliding arm of said potentiometer and a center tap on said primary winding of said output transformer, and means to provide A.-C. ground to the carrier from the center tap of said primary of said output transformer, said adjustable voltage source being adjusted relative to the voltage across the cathode resistance of said cathode follower to provide predetermined desired ratio of carrier frequency output to sideband output.

13. A method of suppressing the carrier in the output wave with respect to sideband amplitude in a modulating system, said method comprising applying a modulating voltage signal in single ended relationship, applying a carrier signal voltage modulating said applied carrier with said modulating signal voltage to provide an output comprising at least sum and difference frequencies of said carrier and said modulating frequencies, and suppressing the carrier in the output wave in accordance with predetermined desired ratio, said suppressing step comprising cancelling the D.-C. voltage of said applied signal modulating voltage with an opposite adjustable D.-C. balancing voltage, said adjusting providing opposing of currents in said predetermined desired ratio through said modulator which are in opposite directions in the output of said modulator where such currents are currents switched on and off by the carrier wave input.

References Cited in the file of this patent

UNITED STATES PATENTS

| | | |
|---|---|---|
| 2,545,250 | Appert | Mar. 13, 1951 |
| 2,820,949 | Hey | Jan. 21, 1958 |
| 2,833,871 | Worthen | May 6, 1958 |

FOREIGN PATENTS

| | | |
|---|---|---|
| 630,083 | Great Britain | Oct. 5, 1949 |